United States Patent
Baumgartner et al.

(10) Patent No.: US 11,518,198 B2
(45) Date of Patent: Dec. 6, 2022

(54) ADAPTER FOR A ROLLING ASSEMBLY AND ROLLING ASSEMBLY COMPRISING SAME

(71) Applicant: COMPAGNIE GENERALE DES ETABLISSEMENTS MICHELIN, Clermont-Ferrand (FR)

(72) Inventors: Gérard Baumgartner, Clermont-Ferrand (FR); Antonio Delfino, Clermont-Ferrand (FR); Daniel Walser, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 305 days.

(21) Appl. No.: 16/336,205

(22) PCT Filed: Sep. 25, 2017

(86) PCT No.: PCT/FR2017/052561
§ 371 (c)(1),
(2) Date: Mar. 25, 2019

(87) PCT Pub. No.: WO2018/055309
PCT Pub. Date: Mar. 29, 2018

(65) Prior Publication Data
US 2019/0299721 A1    Oct. 3, 2019

(30) Foreign Application Priority Data
Sep. 26, 2016 (FR) ........................................ 1659010

(51) Int. Cl.
*B60C 15/02* (2006.01)
*B60B 21/12* (2006.01)
(Continued)

(52) U.S. Cl.
CPC ............ *B60C 15/023* (2013.01); *B60B 21/12* (2013.01); *B60C 15/02* (2013.01); *B60C 5/16* (2013.01); *B60C 2015/042* (2013.01)

(58) Field of Classification Search
CPC ... B60C 15/02; B60C 15/0203; B60C 15/023; B60C 5/16; B60B 21/12; B60B 21/125
See application file for complete search history.

(56) References Cited

U.S. PATENT DOCUMENTS

| | | | | |
|---|---|---|---|---|
| 1,503,883 A | * | 8/1924 | Cobb | ...................... B60C 15/04 245/1.5 |
| 4,321,957 A | * | 3/1982 | Hahn | ...................... B60C 15/04 152/391 |

(Continued)

FOREIGN PATENT DOCUMENTS

| | | |
|---|---|---|
| FR | 2 795 022 A1 | 12/2000 |
| FR | 3 028 449 A1 | 5/2016 |

(Continued)

OTHER PUBLICATIONS

International Search Report dated Nov. 29, 2017, in corresponding PCT/FR2017/052561 (4 pages).

*Primary Examiner* — Jason R Bellinger
(74) *Attorney, Agent, or Firm* — Venable LLP

(57) ABSTRACT

An adapter for a rolling assembly having an axis of rotation (YY') includes an axially inner end connected to a rim, an axially outer end including an outer reinforcing element and intended to come into contact, via a substantially radial axially inner face, or bearing face, with a bead, a body connecting the axially outer end to the axially inner end so as to form a single piece, including at least one main reinforcement providing the connection between the outer reinforcing element and the inner reinforcing element, and including a substantially axial adapter seat intended to come into contact with a bead. The outer reinforcing element (15)

(Continued)

is completely axially on the outside of the bearing face (21), and the outer reinforcing element (15) is a substantially annular structure, referred to as a bead wire, of substantially polygonal section, including at least two first layers of composite and/or metallic material, and at least two second layers of rubber compound, the first and second layers being arranged mutually parallel and in alternation with each other and parallel to the axis YY'.

6 Claims, 2 Drawing Sheets

(51) Int. Cl.
*B60C 5/16* (2006.01)
*B60C 15/04* (2006.01)

(56) References Cited

U.S. PATENT DOCUMENTS

| | | | |
|---|---|---|---|
| 4,373,567 A * | 2/1983 | Declercq | B60B 21/10 |
| | | | 152/379.3 |
| 4,794,967 A * | 1/1989 | Charvet | B60C 15/0027 |
| | | | 152/539 |
| 5,103,886 A * | 4/1992 | Brettschneider | B60C 15/04 |
| | | | 152/451 |
| 5,127,456 A * | 7/1992 | Davriu | B29C 53/564 |
| | | | 152/54 |
| 5,885,388 A * | 3/1999 | Ueyoko | B60C 15/0607 |
| | | | 152/540 |
| 6,626,217 B2 | 9/2003 | Bestgen | |
| 9,902,212 B2 | 2/2018 | Bucher et al. | |
| 10,189,316 B2 * | 1/2019 | Daval | B60C 15/02 |
| 10,328,752 B2 * | 6/2019 | Topin | B60C 5/16 |
| 10,953,690 B2 * | 3/2021 | Barguet | B60B 21/02 |
| 2002/0088520 A1 | 7/2002 | Bestgen | |
| 2013/0186542 A1* | 7/2013 | Aoki | B60C 15/04 |
| | | | 152/539 |
| 2015/0059955 A1* | 3/2015 | Kouno | B29D 30/0678 |
| | | | 152/541 |
| 2015/0075691 A1* | 3/2015 | Merino Lopez | B60C 15/04 |
| | | | 152/502 |
| 2016/0121665 A1* | 5/2016 | Moldenhauer | B60C 19/088 |
| | | | 152/152.1 |
| 2016/0243901 A1* | 8/2016 | Tatsumi | B60C 15/02 |
| 2017/0001473 A1 | 1/2017 | Ahouanto et al. | |
| 2017/0326913 A1 | 11/2017 | Merino Lopez et al. | |
| 2019/0299705 A1 | 10/2019 | Walser | |

FOREIGN PATENT DOCUMENTS

| | | |
|---|---|---|
| JP | 7-96720 A | 4/1995 |
| WO | 2015/091618 A1 | 6/2015 |

* cited by examiner

ADAPTER FOR A ROLLING ASSEMBLY AND ROLLING ASSEMBLY COMPRISING SAME

The present application is a national-stage entry under 35 U.S.C. § 371 of International Application No. PCT/FR2017/052561 filed on Sep. 25, 2017, and claims the benefit of foreign priority under 35 U.S.C. § 119(a)-(d) of French Application No. 1659010 filed on Sep. 26, 2016.

BACKGROUND

The invention relates to an adapter for a rolling assembly comprising a tyre and a rim, the said adapter being intended to provide the connection between the tyre and the rim. The invention also relates to a rolling assembly comprising the said adapter.

A tyre is a toric structure, the axis of revolution of which is the axis of rotation of the tyre, comprising a tread intended to come into contact with the ground, two sidewalls and two beads intended to come into contact with a rim, the two beads being connected to the tread by the two sidewalls.

A reminder of the definitions used in the present invention is given below:
"axial direction YY'": direction parallel to the axis of rotation of the tyre,
"radial direction ZZ'": direction perpendicular to the axis of rotation of the tyre,
"radial plane": plane which contains the axis of rotation of the tyre, and defined by the radial and axial directions,
"circumferential direction XX'": direction perpendicular to a radial plane,
"equatorial plane": plane perpendicular to the axis of rotation and passing through the middle of the tread of the tyre,
"rubber compound": denotes a rubber composition comprising at least one elastomer and one filler.

Insertion of a connecting element or adapter between the rim and the beads of a tyre is already known from application WO2015091618. This adapter, made of reinforced rubber compounds, is elastically deformable at least in the two, radial and axial, directions, and comprises an axially inner end and an axially outer end. Such an adapter makes it possible to separate that part of the rolling assembly that can be considered to actually act as a tyre from that part of the rolling assembly that can be considered to act as a rim.

However, although such a rolling assembly allows the tyre to perform its conventional functions, notably a drift thrust response following the application of a drift angle to the tyre, thereby giving the rolling assembly sufficient flexibility to protect the tyre from any damage, it may cause cracks to appear or even spread in the outer reinforcer, that constitutes the axially outer end, as a result of multiple repeated shocks of the "pothole" type.

Specifically, the adapter of the above-referenced prior art, which ensures connection between each bead of the tyre and the rim, does not have optimum mechanical features, chiefly in terms of stiffness, that make it possible to absorb large deformations as the rolling assembly passes over potholes. This may lead to residual plastic deformation, or even breakage, of the said adapter and, therefore, to damage to the rolling assembly.

In addition, that document gives no suggestion regarding adapter design evolutions that might make it possible to overcome the aforementioned disadvantages.

SUMMARY

Hence the inventors have set themselves the objective of proposing a new adapter which has a low mass, and elastic deformation while at the same time having a stiffness that varies according to the circumferential, axial and radial axes.

One subject of the invention is thus an adapter for a rolling assembly having an axis of rotation (YY'), the rolling assembly comprising:
a tyre having two beads,
a rim having two rim bead seats, for each bead, the said adapter providing the connection between the bead and the rim,
the said adapter comprising:
an axially inner end connected to the rim,
an axially outer end comprising an outer reinforcing element and intended to come into contact, via a substantially radial axially inner face, or bearing face, with a bead,
a body connecting the axially outer end to the axially inner end so as to form a single piece, comprising at least one main reinforcement providing the connection between the outer reinforcing element and the inner reinforcing element, and comprising a substantially axial adapter seat intended to come into contact with a bead, the said ends and body being arranged along an axial axis YY'.

The adapter is characterized in that the outer reinforcing element is completely axially on the outside of the bearing face, and in that the outer reinforcing element is a substantially annular structure, referred to as a bead wire, of substantially polygonal section, comprising at least two first layers of composite and/or metallic material, and at least two second layers of rubber compound, the said first and second layers being arranged mutually parallel and in alternation with each other and parallel to the axis YY'.

The adapter according to the invention, the element connecting tyre and rim, allows a rolling assembly, during running, to avoid excessively high shear stresses in the core of the reinforcing element, and therefore makes it possible to increase the mechanical travel of the adapter while at the same time allowing the materials of which the adapter is made to exhibit elastic deformation.

Another advantage of the adapter according to the invention is that of allowing, on the one hand, a compression stiffness that is high enough to guarantee its mechanical stability and, on the other hand, a bending stiffness that is high so as to spread the mechanical load as far as possible away from the point of impact during kerbing or when running over a pothole.

The axially outer end of the adapter axially delimits a portion of the adapter body, referred to as adapter seat, and intended to receive a tyre bead. The adapter seat performs the same function as a rim seat, which is the substantially axial portion of a rim bead seat. In the axial direction, the bearing face of the axially outer end serves to support the bead of the tyre in the manner of a rim flange, which is the substantially radial portion of a rim bead seat. The tyre is therefore axially immobilized by the inflation pressure and is pressed firmly against the bearing face of this axially outer end, in the manner of what happens conventionally in the case of a bead of a tyre pressed against a rim flange.

The axially inner end of the adapter could be termed an "adapter bead" since it may be intended to attach the adapter to the seat of a rim bead in the same way as is conventionally done by a bead of a tyre pressed against a rim bead seat.

For preference, the axially inner end is connected to an edge of the rim, such as a rim flange, by any fixing means, such as by the conventional technique of clamping, bonding, crimping, screwing, with one or more centring grooves with or without reinforcement for clamping against a rim flange.

For preference, the rubber compound has a secant modulus greater than or equal to 10 MPa and less than or equal to 100 MPa.

For preference, the rubber compound has an elastic elongation greater than or equal to 50%.

The rubber mixture may be selected from the elastomer compositions conventionally used in the field of tyres, for instance diene or polyurethane compositions.

For preference, the composite or metallic material has a Young's modulus greater than or equal to 40 GPa and less than or equal to 200 GPa.

Another subject of the invention is a mounted assembly comprising the adapter as described hereinabove.

BRIEF DESCRIPTION OF THE FIGURES

The invention is described with reference to the following FIGS. 1 to 3, which are schematic and not necessarily drawn to scale.

DETAILED DESCRIPTION

Figure 1:
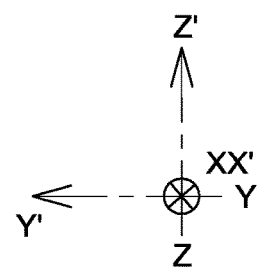
FIG. 1: a radial section of a non-mounted adapter, according to a first alternative form of the invention.
Figure 1:
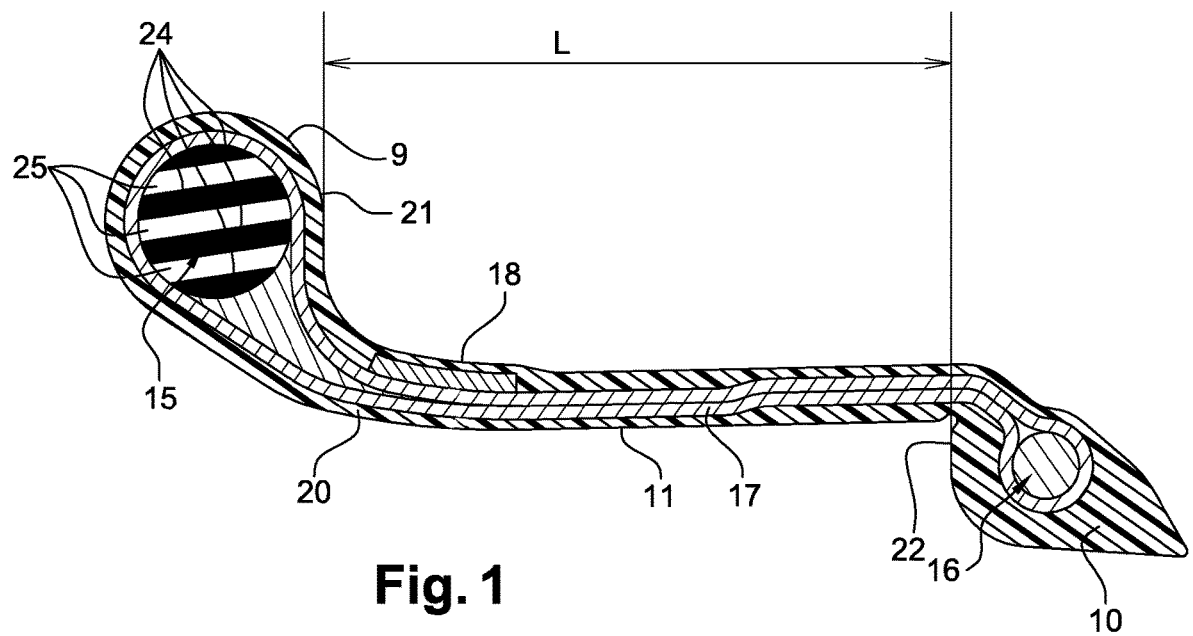

FIG. 1 depicts an adapter, not mounted on a rim, according to a first alternative form of the invention. This adapter comprises an axially outer end 9 comprising an outer reinforcing element 15, an axially inner end 10 comprising an inner reinforcing element 16, and a body 11 comprising a main reinforcement 17. The main reinforcement 17 is made up of a single reinforcing layer which is wound respectively around the inner reinforcing element 16 of the axially inner end 10 and around the outer reinforcing element 15 of the axially outer end 9. In the body 11, the main and return portions of the said reinforcing layer thus constitute a substantially radial stack of at least two reinforcing layers. The main reinforcement 17 is enveloped in a layer of rubber compound 20. The body 11 further comprises an adapter seat 18 which is intended to come into contact with a tyre bead. The body 11 has an axial width L, measured between the axially inner face 21 of the axially outer end 9 and the axially outer face 22 of the axially inner end 10.

In FIG. 1, the outer reinforcing element 15 is an annular structure, referred to as a bead wire, made up of four layers 24 of composite material which are made up of unidirectional glass fibres having a Young's modulus equal to 73 GPa. The fibres are arranged in the circumferential direction and are coated with a vinyl ester resin having a Young's modulus of 3.5 GPa. The proportion of glass fibres is 70%. The Young's modulus of each layer 24, considered overall, is 40 GPa.

The rubber compound 25 may be polyurethane with a secant modulus comprised between 10 MPa and 100 MPa. The layers 24 and 25 are arranged in alternation in a radial direction ZZ', and parallel to one another and substantially parallel to the direction YY'.

Figure 2:
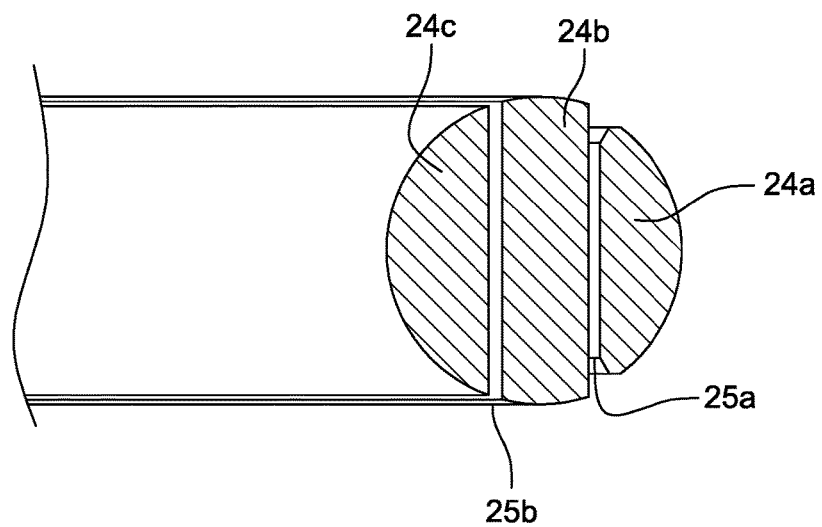
FIG. 2: a three-dimensional view of the axially outer end of the adapter, according to the invention.

FIG. 2 depicts one embodiment of the axially outer end 15. In this embodiment, the layer 24 is made up of three sub-layers 24a, 24b and 24c with a thickness equal to 2.7 mm, 2.0 mm and 3.4 m, respectively. The thickness is measured in the widest portion of the said sub-layer. The layer 25 is also divided into sub-layers 25a and 25b, both having a thickness equal to 0.5 mm. The mean diameter of the axially outer reinforcement 15 is comprised between 8 mm and 16 mm.

The rubber compound 25 makes it possible to absorb the shear that occurs during running while at the same time providing enough overall flexural stiffness (compression and torsion) via its secant modulus.

Figure 3:
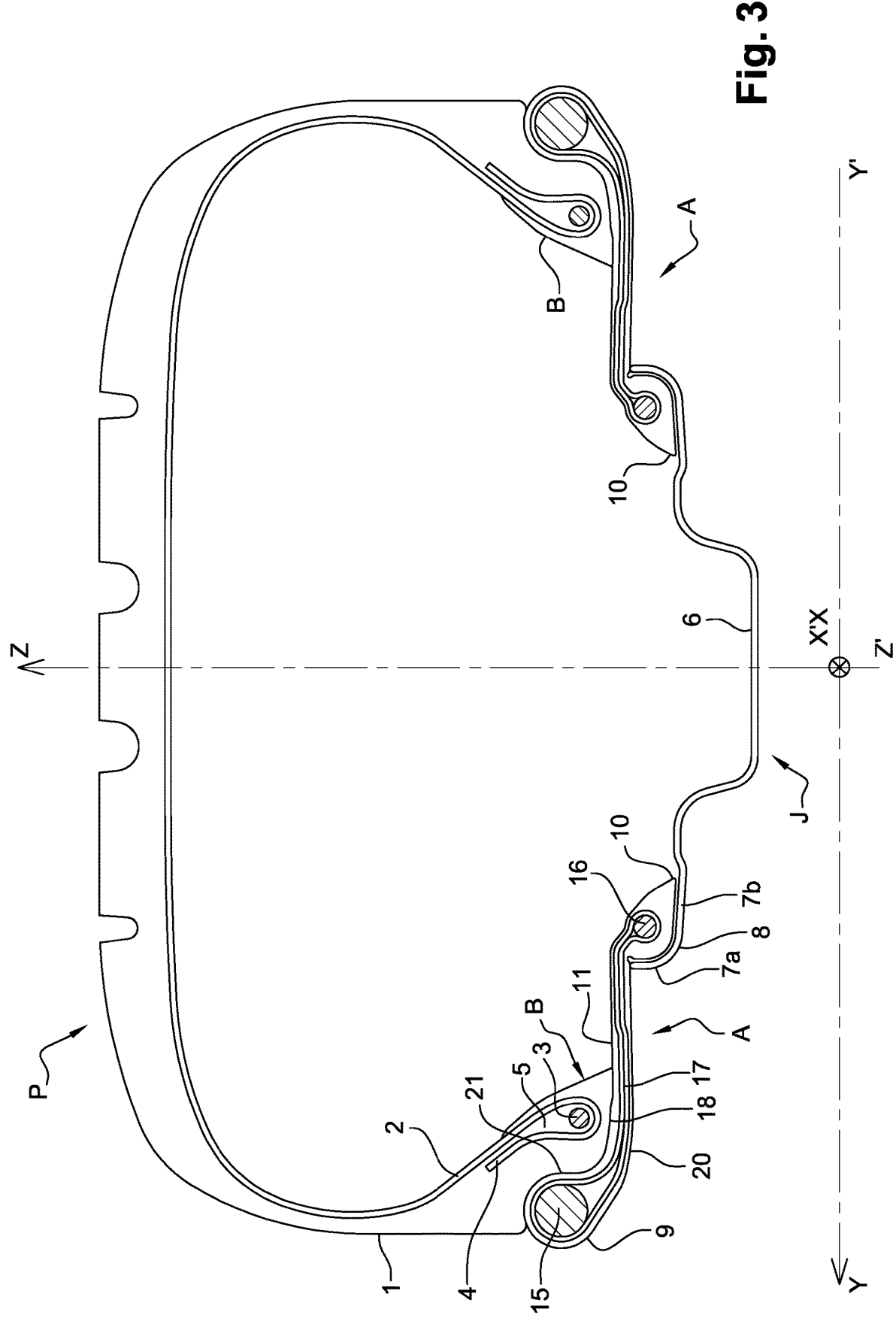
FIG. 3: a radial section of a rolling assembly comprising two adapters.

FIG. 3 shows a radial section, in a plane YZ, of a rolling assembly comprising a tyre P, a rim J, and, for each bead B, an adapter A providing the connection between the bead B and the rim J. The tyre P comprises a tread (unreferenced) extended radially towards the inside by two sidewalls 1, themselves extended radially towards the inside by two beads B. Within each bead B, the carcass reinforcement 2 is turned up around a circumferential reinforcing element or bead wire 3 to form a turnup 4 separated from the carcass reinforcement 2 by a filling element 5. The rim J comprises, in a middle portion, a mounting well 6, intended to make it easier to mount the beads B of the tyre P and, at its axial ends, two rim bead seats 8, each one comprising a substantially radial portion or rim flange 7a and a substantially axial portion or rim seat 7b. The adapter A comprises an axially inner end 10 comprising an inner reinforcing element 16 and intended to be mounted on a rim bead seat 8, an axially outer end 9 comprising an outer reinforcing element 15, as defined above, and intended to come into contact via a substantially radial axially inner face, or bearing face 21, with a bead B, and finally a body 11, connecting the axially outer end 9 to the axially inner end 10 so as to form a single piece, comprising at least one main reinforcement 17 providing the connection between the outer reinforcing element 15 and the inner reinforcing element 16, and comprising a substantially axial adapter seat 18 intended to come into contact with a bead B.

The invention claimed is:

1. An adapter for a rolling assembly having an axial axis, the rolling assembly comprising a tire having two beads, and a wheel rim having two wheel rim bead seats, where, for each bead, the adapter provides the connection between the bead and the wheel rim, the adapter comprising:

an axially inner end comprising an inner reinforcing element connected to the wheel rim;

an axially outer end comprising an outer reinforcing element comprising a substantially radial axially inner face intended to come into contact with the bead;

a body connecting the axially outer end to the axially inner end, comprising at least one main reinforcement providing the connection between the outer reinforcing element and the inner reinforcing element, and comprising a substantially axial adapter seat intended to come into contact with the bead, the axially outer end and the axially inner end and the body being arranged along the axial axis, wherein the outer reinforcing element is completely axially on the outside of the substantially radial axially inner face of the axially outer end, wherein the outer reinforcing element is a substantially annular structure having a mean diameter between 8 mm and 16 mm, comprising at least two first layers of composite and/or metallic material, and at least two second layers of rubber compound, the first and second layers being uninterrupted layers arranged mutually parallel and in alternation with each other and parallel to the axial axis, and wherein a thickness of each of the at least two first layers is greater than a thickness of each of the at least two second layers, the thickness being measured at a widest portion of each of the first and second layers, respectively.

2. The adapter according to claim 1, wherein the rubber compound has a secant modulus greater than or equal to 10 MPa and less than or equal to 100 MPa.

3. The adapter according to claim 1, wherein the rubber compound has an elastic elongation greater than or equal to 50%.

4. The adapter according to claim 1, wherein the composite and/or metallic material has a Young's modulus greater than or equal to 40 GPa and less than or equal to 200 GPa.

5. The adapter according to claim 1, wherein the rubber compound is selected from a diene and polyurethane compositions.

6. A rolling assembly comprising the adapter according to claim 1.

* * * * *